(No Model.) 2 Sheets—Sheet 1.
H. BRACKETT.
MOWING MACHINE.
No. 386,519. Patented July 24, 1888.
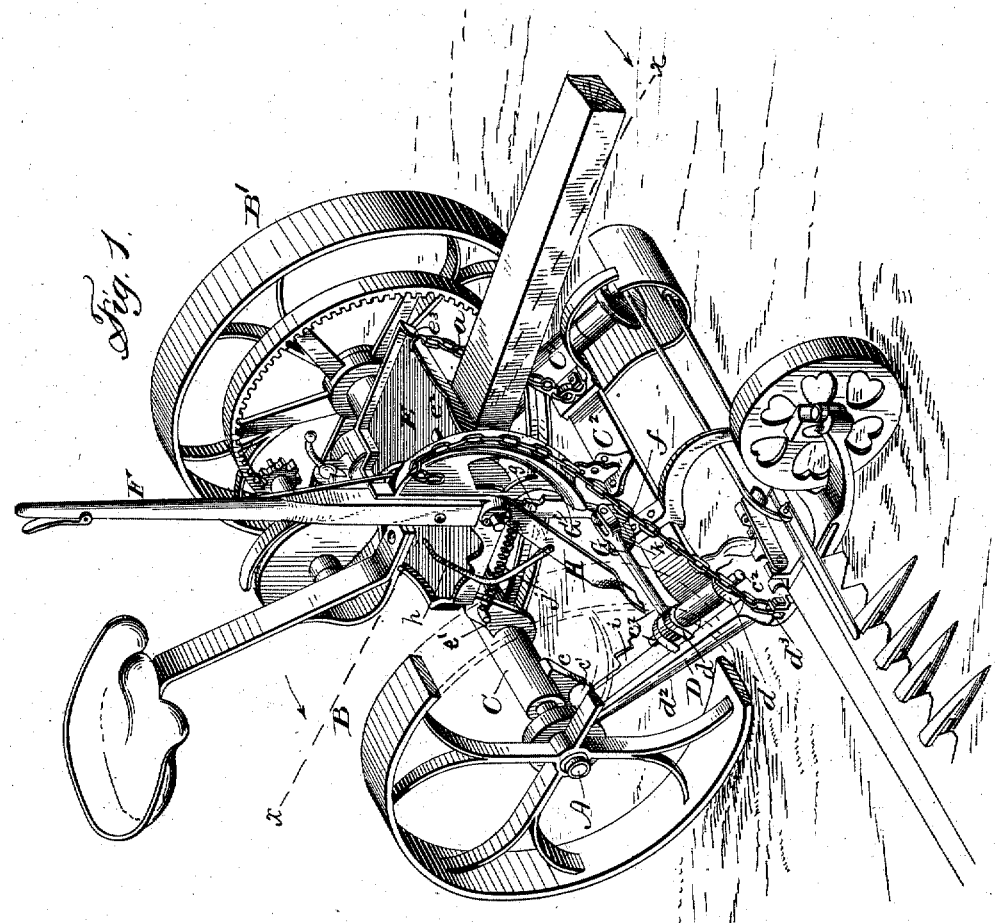
Fig. 1.
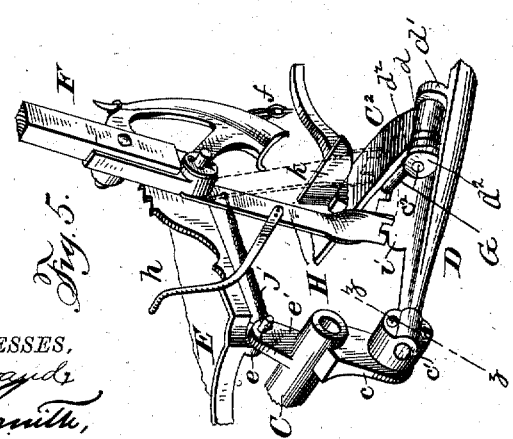
Fig. 5.
Fig. 5.ª
WITNESSES.
F. L. Ourand
Rex Smith
INVENTOR.
Henry Brackett.
by A. M. Smith
Attorney.

(No Model.) 2 Sheets—Sheet 2.
H. BRACKETT.
MOWING MACHINE.
No. 386,519. Patented July 24, 1888.
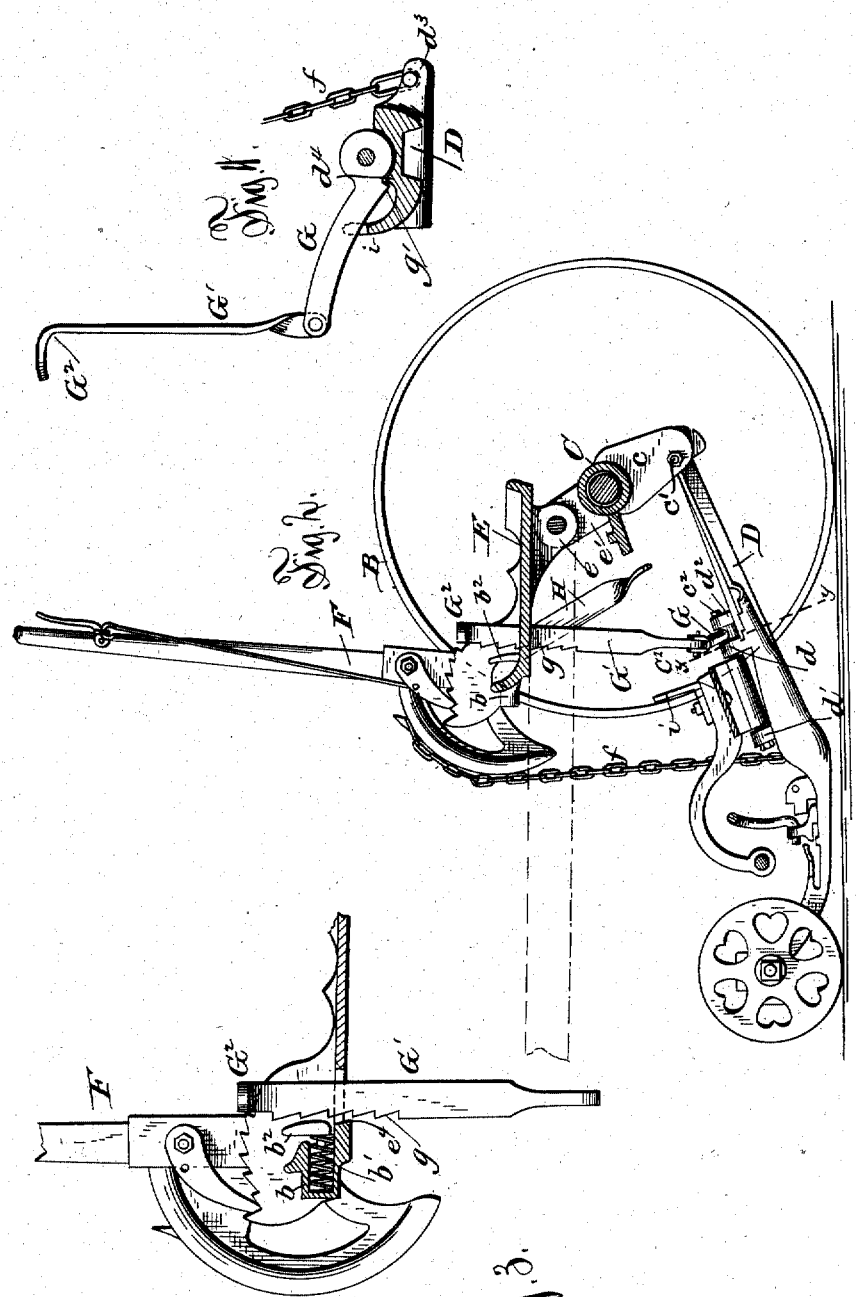
WITNESSES.
INVENTOR.
Henry Brackett.
by A. M. Smith
Attorney.

UNITED STATES PATENT OFFICE.

HENRY BRACKETT, OF MOREAU, NEW YORK.

MOWING-MACHINE.

SPECIFICATION forming part of Letters Patent No. 386,519, dated July 24, 1888.

Application filed February 13, 1886. Serial No. 191,828. (No model.)

*To all whom it may concern:*

Be it known that I, HENRY BRACKETT, of Moreau, county of Saratoga, and State of New York, have invented a new and useful Improvement in Mowing-Machines, of which the following is a full, clear, and exact description, reference being had to the accompanying drawings, making part of this specification.

My invention relates to the means for adjusting and controlling a cutting apparatus adapted to follow and conform to inequalities in the surface of the ground over which it is drawn, as hereinafter described and claimed.

In the accompanying drawings, Figure 1 is a perspective view of a mowing-machine with one wheel partly broken away to show my improvements applied. Fig. 2 represents a vertical longitudinal section through the same, showing one form of the adjusting devices and the hinged shoe and thrust-brace in side elevation. Fig. 3 is a section through the driver's foot-board, on the line $x$ $x$, Fig. 1, with the adjusting devices enlarged. Fig. 4 represents a transverse section through the shoe-brace in rear of the coupling-arm, on the line $y$ $y$, Fig. 2, showing the pivoted arm or dog, rack-bar, and a part of the lifting-chain in rear elevation; Fig. 5, a perspective view, looking from the rear grain side, of parts of the machine, showing a secondary or supplemental pivoted stop; Fig. 5$^a$, a section on the line $z$ $z$ of Fig. 5, showing the swiveling connection of the rear end of the thrust-bar to the frame.

The machine in its general construction and arrangement of parts is of a type well known and in common use, and will therefore be described in detail only so far as is necessary to an understanding of my improvements.

A represents the axle; B B′, the driving-wheels connected therewith; C, the sleeve of the main or cutter frame, mounted and adapted to rock on said axle; and C′ a forwardly-projecting arm or sleeve of the sleeve C, formed upon or rigidly connected with and suitably braced from the latter, and in suitable bearings in which the crank-shaft is mounted. The sleeve C has at its inner end a pendent arm, $c$, to which a swiveling block, $c'$, is connected by a transverse pivot, and to this swiveling block the thrust-bar D is connected through a longitudinal pivot or journal formed on its rear end, this construction permitting the shoe formed upon or rigidly secured to the forward end of said bar to both rise and fall in the line of draft, and also to rock or roll laterally on its longitudinal axis, for adapting the finger-bar secured to the shoe to follow the surface of the ground. The arm C′ of the sleeve C has one end of an elastic bar, C², rigidly secured to it, and the opposite end of this bar has a sleeve formed upon it, through which it is connected by a longitudinal pin, $c^2$, with suitable lugs, $d$ $d'$, or ears formed on the brace D in rear of the shoe proper, for permitting the rolling movement of the shoe and thrust-brace on their longitudinal axis, as explained.

The tongue of the machine is rigidly secured to the tongue frame or plate E, which may also form the driver's foot-board, and is provided with ears $e$, through which it is pivoted to suitable ears, $e'$, formed on the sleeve C.

The sleeve C, with its arm C′, and the thrust-bar D, connected with the sleeve C, together with the coupling-arm C², connecting the thrust-bar D with the arm C′, form the main or cutter-carrying frame, vibrating on the axle to allow the cutting apparatus to rise and fall relatively to the tongue in following the surface of the ground in a manner well understood.

For preventing the cutting apparatus from falling into sudden and unusually deep depressions, such as would be liable to cause the points of the fingers to enter the ground, or such as, through the sudden vibration, with the cutter-frame, of the pinion through which motion is communicated to the cutters, would temporarily stop or retard the rotation of said pinion and the action of the cutters, and thereby to clog the latter, a chain, $a$, is secured at its lower end to the cutter frame and adjustably connected through its links with a fork or notch at $e^3$ in the forward upright flange, $e^2$, of the tongue-plate E, or other suitable support on the tongue. By adjusting or taking up or letting out the chain in a manner that will be readily understood, the distance the forward end of the cutter-frame can descend below the tongue can be regulated at will and the difficulty named, to a great extent, obviated.

The tongue-plate (or tongue) has pivoted to its inner side, which overhangs the shoe, a quadrant lever, F, from which a chain, $f$, extends down and has its lower end secured to a laterally-projecting flange or ear, $d^3$, on the grain side of the thrust-bar or heel end of the shoe proper in rear of the finger-bar and outside of the longitudinal vertical plane of the pivots connecting the thrust-bar with the axle-sleeve and coupling bar of the cutter-frame, as shown in Figs. 1 and 4, thereby causing said chain, when the lever F is vibrated for raising the cutters, to not only lift the forward end of the cutter-frame, but also to tend to rock the thrust-bar laterally on its longitudinal pivot, and thereby to raise the outer end of the cutting apparatus. To make the lifting device effective for this last-named purpose, the pin or pivot $c^2$, which connects the thrust-bar with the coupling-arm $C^2$, is extended beyond or in rear of the lug or ear $d$ and through an additional ear, $d^2$, and upon said pin between the ears $d$ and $d^2$ is pivoted loosely an inwardly-projecting arm, G, the inner end of which has pivoted to it the lower end of an upright bar, G', having a toothed rack, $g$, on its forward edge, and which passes up through a slot in the tongue-plate or driver's foot-board, as shown. This rack-bar G' is similar to that described in Letters Patent granted to E. F. and J. Herrington, April 9, 1861, No. 31,973, except that in said patent it was secured at its lower end to the shoe or cutter-frame, and so did not provide for that full freedom of movement of the hinged shoe necessary to permit the cutting apparatus to be folded over on the machine or tongue without displacing or disturbing the working relation of some of the parts. As stated, the arm G, to which the rack-bar G' is connected, is pivoted loosely on the pin $c^2$ and is adapted to engage a shoulder, $d^4$, on the shoe when the arm G is held down by the rack-bar, and thereby to lock the thrust-bar against rocking outward and downward. The upper end of the rack-bar is provided with a horizontal arm or stirrup, $G^2$, in convenient position to be acted upon by the driver's hand or foot and the forward wall of the slot in the driver's foot-board, through which the rack-bar passes, is inclined, as shown at $e^4$, Fig. 3, to give it the form of a tooth adapted to engage the teeth $g$ on the forward face of the rack-bar when the latter is pressed forward by the driver's foot. Within a suitable socket at $b$ on the driver's foot-board is arranged a spiral spring, $b'$, which at its rear end presses against a block or shoe, $b^2$, adapted to slide on the foot-board, with its rear slightly-rounded face resting against the toothed face of the rack-bar, and adapted, when the tension of the spring $b'$ is not overcome by the pressure of the driver's foot on the rack-bar, to hold the latter out of engagement with the tooth $e^4$, and adapting said bar to rise and fall freely through the slot in the foot-board in conforming to the rising and falling movements of the cutter-frame relative to said foot-board in following the surface of the ground. By this arrangement it will be seen that while the rack-bar, and with it the forward end of the cutter-frame, can freely rise and fall in allowing the cutting apparatus to follow the ground when the rack-bar is left free, whenever the driver desires to raise the cutter-frame and inner end of the cutting apparatus he can readily do so by operating the quadrant lever, and after raising said frame and inner end of the cutting apparatus to the desired height by pressing the rack-bar G' into engagement with the tooth $e^4$ the inner end of the arm G will be held against further upward movement, and the power of the quadrant lever will then be exerted to rock the bar D laterally on its longitudinal pivot and thus to raise the outer end of the cutting apparatus for passing an obstruction or for other purpose. It will readily be seen that the upward movement of the cutter-frame can be checked at will by the driver by pressing the rack G' into engagement with the tooth $e^4$. After lifting the cutting apparatus, as described, if it is desired to further raise the outer end of the cutting apparatus for folding the latter over on the tongue for transportation or other purpose it can be readily done, as the shoulder $d^4$ will leave the shoulder $g'$, and the thrust-bar can thus be rolled over for causing the cutting apparatus to rest on the tongue without cramping or disturbing the arrangement of the other parts.

The lifting quadrant lever may be held at the desired adjustment by any usual or preferred arrangement of rack and pawl, such as indicated in the drawings.

In addition to the arrangement described for checking the upward movement of the cutter-frame and causing the power of the lifting-lever to be applied to raising the outer end of the cutting apparatus, I use a pendent bar, H, connected by a transverse pivot at its upper end with the driver's foot-board, and having a rearwardly and upwardly projecting arm, $h$, extending to a point within convenient reach of the driver's foot or hand. This bar has its lower end set with its greater width at right angles, or thereabout, to its upper pivoted end, and is forked to adapt it to engage a lip or flange, $i$, Fig. 5, formed on the inner side of the shoe-brace. The bar H is connected by a spiral spring, $j$, with a lug or ear, $e$ or $e'$, on the tongue plate or sleeve C, the tension of said spring being exerted to hold the bar H swung back and up out of the way, except when said tension is overcome by pressure on the arm $h$, when the bar H can be swung down into engagement with the lip or flange $i$, and by holding the latter and the shoe-brace from rising, the force of the lifting-lever will be exerted to raise the outer end of the cutting apparatus, the same as when the rack-bar G is employed, as explained. The flange $i$ on the inner side of the shoe has on its upturned edge a series of steps rising toward the front, as shown in Figs. 1, 2, and 5, with any one of which the pendent bar or stop H may engage, thus varying the point at which the upward movement of the cutter-frame will be checked, or said stop may be swung forward far enough to engage or rest upon the coupling-arm $C^2$, as indicated by dotted lines, Fig. 5, if desired, and thus to stop the upward movement of the cutter-frame, a guard or stop-plate at $k$ on said coupling-arm serving to limit the forward throw of the pivoted stop H, and to prevent it from slipping forward off the coupling-bar. This construction last described is supplemental to the rack-bar arrangement thereto, so that either arrangement may be used, as may suit the convenience of the driver, or one in case the other should from any cause become inoperative.

Having now described my invention, I claim as new—

1. The combination, with the draft-frame and main frame, the latter having sleeves C and C′, provided one with a pendent arm, $c$, and the other with the elastic coupling-arm $C^2$, of the thrust-bar and shoe D, having both a longitudinal and a transverse pivotal connection with said main frame, and provided with the stepped flange $i$, the gag-lever G, pivoted on said thrust-bar, the rack G′, pivoted to said gag-lever and adapted to engage the draft-frame, as described, the arm or stop H, pivoted on said draft-frame, said gag-lever and arm or stop being both adapted to act on the thrust-bar on the stubble side of its longitudinal pivot, and the lifting-lever F, also pivoted on said draft-frame and connected with the thrust-bar and shoe at a point on the grain side of the longitudinal pivot of the latter, all substantially as and for the purpose specified.

2. The combination, with the draft-frame and the longitudinally-pivoted thrust-bar and shoe, of the gag-lever G, pivoted on said thrust-bar, the rack-bar G′, pivoted to said gag-lever and provided on its upper end with ratchet-teeth $g$, adapted to engage a tooth, $e^4$, on the draft-frame, and the sliding block or shoe $b^2$ and spring $b'$ on said draft-frame for holding said rack-bar normally out of engagement with said frame, substantially as described.

In testimony whereof I have hereunto set my hand this 9th day of February, A. D. 1886.

HENRY BRACKETT.

Witnesses:
 EDGAR T. BRACKETT,
 ALEMBERT POND.